US012434949B2

(12) United States Patent
Schmid et al.

(10) Patent No.: US 12,434,949 B2
(45) Date of Patent: Oct. 7, 2025

(54) CABLE WINCH, METHOD FOR WINDING A CABLE WINCH OF THIS TYPE, AND CRANE HAVING A CABLE WINCH

(71) Applicant: Liebherr-Components Biberach GmbH, Biberach an der Riss (DE)

(72) Inventors: Thomas Schmid, Daugendorf (DE); Gerd Hepp, Unterstadion (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 240 days.

(21) Appl. No.: 17/937,697

(22) Filed: Oct. 3, 2022

(65) Prior Publication Data

US 2023/0079781 A1 Mar. 16, 2023

Related U.S. Application Data

(63) Continuation of application No. PCT/EP2021/059248, filed on Apr. 9, 2021.

(30) Foreign Application Priority Data

Apr. 14, 2020 (DE) ..................... 10 2020 110 145.7
Jul. 9, 2020 (DE) ..................... 10 2020 118 088.8

(51) Int. Cl.
*B66D 1/38* (2006.01)
*B66B 11/00* (2006.01)
*B66C 13/54* (2006.01)

(52) U.S. Cl.
CPC ............ *B66D 1/38* (2013.01); *B66B 11/0075* (2013.01); *B66C 13/54* (2013.01)

(58) Field of Classification Search
CPC ....... B66B 11/0065–0075; B66B 15/06; B66B 11/06; B66D 1/38; B66C 13/54
See application file for complete search history.

(56) References Cited

U.S. PATENT DOCUMENTS 605,937 A * 6/1898 Turner ................ B66B 11/0075 187/252
4,600,086 A * 7/1986 Yamasaki ............... B66B 11/06 248/680
2005/0230671 A1* 10/2005 Mott ........................ B66D 1/38 254/266
2009/0261311 A1* 10/2009 Mann ....................... B66D 1/16 254/323
2014/0080615 A1* 3/2014 Sowka ..................... B66D 1/20 472/78
2015/0008381 A1 1/2015 Hausladen et al.
(Continued)

FOREIGN PATENT DOCUMENTS

DE 2307355 8/1973
DE 68910112 2/1994
DE 202005011277 12/2006
(Continued)

*Primary Examiner* — Anna M Momper
*Assistant Examiner* — Nathaniel L Adams
(74) *Attorney, Agent, or Firm* — Levine Bagade Han LLP

(57) ABSTRACT

The invention relates to a method for winding a cable winch, in which method a plurality of cable winding layers is wound one over the other, a plurality of cables being wound, in multiple strands, onto the same winding region of the cable winch such that the cables are adjacent to each other in the same cable winding layer.

21 Claims, 6 Drawing Sheets a)

b)

Winding of a plurality of cables in a plurality of turns, preferably with a constant pitch Winding of a plurality of cables in a plurality of turns, preferably with a constant pitch

(56) References Cited

U.S. PATENT DOCUMENTS

| | | | | |
|---|---|---|---|---|
| 2016/0031685 A1* | 2/2016 | Lawson | B66D 1/30 414/800 | |

FOREIGN PATENT DOCUMENTS

| | | | | | |
|---|---|---|---|---|---|
| DE | 102011113210 | | | 3/2013 | |
| DE | 102022202584 | B3 | * | 6/2023 | B66D 1/39 |
| GB | 1411177 | A | * | 10/1975 | B66C 13/12 |
| GB | 2155904 | | | 10/1985 | |
| JP | S60-197579 | | | 10/1985 | |
| JP | S60-218280 | | | 10/1985 | |
| JP | 07196288 | A | * | 8/1995 | B66D 1/38 |
| JP | H11-11882 | | | 1/1999 | |
| JP | 2000-352189 | | | 12/2000 | |
| KR | 100293965 | B1 | * | 11/2001 | B66D 1/38 |
| SU | 724433 | | | 3/1980 | |
| WO | WO 2021/209324 | | | 10/2021 | |

* cited by examiner

Winding of a plurality of cables in a plurality of turns, preferably with a constant pitch Winding of a plurality of cables in a plurality of turns, preferably with a constant pitch Winding of a plurality of cables in a plurality of turns, preferably with a constant pitch

CABLE WINCH, METHOD FOR WINDING A CABLE WINCH OF THIS TYPE, AND CRANE HAVING A CABLE WINCH

CROSS-REFERENCE TO RELATED APPLICATIONS

This application is a continuation of International Patent Application Number PCT/EP2021/059248 filed Apr. 9, 2021, which claims priority to German Patent Application Numbers DE 10 2020 110 145.7 filed Apr. 14, 2020 and DE 10 2020 118 088.8 filed Jul. 9, 2020, all of which are incorporated herein by reference in their entireties.

BACKGROUND

The present invention relates to a method for winding a cable winch in a plurality of layers, as well as to a cable winch having a drum onto which at least one cable can be wound, as well as to a hoisting device such as a crane having such a cable winch.

Cable winches are used for winding on and unwinding a cable as well as for generating a cable tension force in various applications, whereas cable winches find their application mainly in the field of materials handling technology. Typically, the torque on the cable drum of the cable winch is generated with the aid of an electric or hydraulic drive, to which, for example, there may be connected a transmission. Depending on the lever arm of the cable running in or off, there is generated a corresponding cable tension force.

When the cable is wound on, it is stored on the cable drum of the cable winch. For the purpose of achieving a correspondingly large winding capacity, in many applications the cable is wound on the cable drum in a plurality of layers and stored there. If the cable is reeved in multiple strands according to the pulley block principle, a long cable length is necessary to achieve sufficient adjustment path of the load hook or the towing block.

Cable winches with windings in a plurality of layers are used, for example, as hoisting winches in various crane applications for vertical movement of a hoisting load, whereas the cable in such hoisting winches is usually not designed redundantly or only one cable is wound onto the hoisting winch.

However, cable drums with windings in a plurality of layers are also used as luffing winches, for example in various types of cranes for luffing the boom up and down. Such luffing winches are sometimes designed with a secondary brake and thus have brake redundancy, as is often, for example, the case with revolving tower cranes. However, in case of such luffing units the cable is (usually) not designed redundantly.

An example of redundantly designed cable guide in case of cable drums with windings in a plurality of layers is, for example, the car drive in mobile construction cranes for the vertical movement of the car or also the car drive of a passenger elevator. For passenger transportation, two cables are usually used to achieve redundancy, with the two cables usually being wound up and stored in separate winding regions of the cable drum. This results in a correspondingly wide installation space, which, depending on the device or the installation environment, poses a challenge for achieving the necessary deflection angles of the cable. A similar winding situation also occurs when not two completely separate cables, but the two cable ends of one cable are wound onto the drum at the same time, as is the case, for example, when the cable running off the drum is deflected or reeved around a deflection pulley and then returned to the drum. By winding both ends of the cable, the cable does not need a fixed abutment point, for example, on the boom or on another structural part.

However, winding the drum of a cable winch in a plurality of layers entails various difficulties which can shorten the service life of the cable to be wound up, cf. for example Ulrich Weiβkopf: Untersuchung zur Lebensdauer von Kranhubseilen in der Mehrlagenwicklung, in Berichte aus dem Institut für Fördertechnik and Logistik der Universität Stuttgart, July 2008. In particular, if the cable diameter is not exactly constant, there may be distortions in the pitch or varying pitches during winding and the cable of one cable winding layer may cut into an underlying cable winding layer, i.e. the cable in a second winding layer, for example, may cut into between the turns of the cable in the first winding layer below. This leads not only to excessive wear, but also during the pulling loose of the cable that is cutting in from the clamping of the underlying layer, it can lead to major irregularities in the cable tension and the running speed, and thus to dangerous load oscillations.

Up to now, winding the cable drums in a plurality of layers of said type has mostly been achieved with the so-called Lebus winding system, in which a grooved cable drum is used, the grooves of which have alternating parallel regions and intersecting regions. Usually, there is not provided any redundant cable guide and only one cable is wound onto the cable winch. In order to be able to wind a plurality of cables for redundant cable guide, there is usually used a plurality of cable winches or a cable winch with a plurality of separate winding regions.

In said Lebus system, the layer change of the respective cable layers must take place at a certain point, i.e. at a certain angle of rotation of the cable drum, since for each cable layer the parallel areas must lie above the parallel areas of the underlying cable layer. Therefore, a satisfactory image of the progression of the winding of the cable can only be produced if very tight tolerances can be maintained for cable diameter and cable drum.

As a result, the Lebus system mentioned above can usually only be used with steel cables, since high-strength fiber ropes made of synthetic fibers cannot maintain the tight tolerances with regard to cable diameter, or can only do so with very expensive manufacturing measures.

Since the values for transverse elasticity of commercially available fiber ropes are usually below those of comparable steel cables, the fiber rope deforms more under load, which can also lead to an unsatisfactory image of the progression of the winding of the cable with said Lebus system.

Irrespective of this, winding with low cable tension force and unwinding with high cable tension force in the parallel area of the Lebus winding system can cause the cable to cut into the cable layers below. This leads to winding disturbances and cable damage, which shortens the service life of the cable and impairs the operation of the cable winch or the hoisting device operating therewith.

SUMMARY

So proceeding from this, it is therefore an underlying object of the invention to provide an improved method for winding a cable winch, an improved cable winch as well as an improved hoisting device having such a cable winch, which avoid the disadvantages of the prior art and further develop the latter in an advantageous manner. In particular, the objective is to achieve improved winding behavior during winding in a plurality of layers, which is not susceptible to cable tolerances, especially cable diameter tolerances, is also suitable for lower transverse elasticities of the cable, and prevents a cable strand from cutting into cable winding layers located underneath.

Said object is solved according to the invention by a method as claimed in claim 1, a winch as claimed in claim 7, a hoisting device as claimed in claim 18, and a conveying device as claimed in claim 21. Preferred embodiments of the invention are the subject-matter of the dependent claims.

In order to achieve a more uniform image of the progression of the winding of the cable with less risk of cutting in, it is suggested that a plurality of cables or a plurality of cable ends be wound onto the same winding region of the cable winch in multiple strands adjacent to each other in the same cable winding layer. This not only provides redundant cable guide, but also a larger pitch and correspondingly a larger crossing angle of the cable courses of superimposed cable winding layers, which significantly reduces the risk of cutting in. In addition, the distribution of cable tension over a plurality of cables allows for smaller cable diameters when the number of strands in the pulley block is increased, which in turn allows for a smaller drum diameter while maintaining the same diameter ratio, i.e., the ratio of the drum diameter to the cable diameter. The smaller lever arm resulting from this results in a lower torque at the cable drum for the same cable tension force, which makes it possible to use a smaller transmission size. While considering applications with usually very large cable diameters, such as those used in the offshore sector, it also results in easier handling and transport of the cables if, instead of one cable with a very large cable diameter, two smaller or more small cables with a smaller diameter have to be transported and stowed.

In particular, the plurality of cables or the plurality of cable ends lying directly adjacent to each other are wound up in multiple strands in the same cable winding layer of a winding region in such a way that, in the winding layer pattern of a winding layer, the various cables lie alternately adjacent to each other. If, for example, two cables are wound up, an alternating cable arrangement of the type "cable 1-cable 2-cable 1-cable 2 etc." is wound up in a respective cable winding layer. If three cables are wound onto the same winding region of the drum, a cable arrangement of the type "cable 1-cable 2-cable 3-cable 1-cable 2-cable 3-cable 1-cable 2-cable 3 etc." is wound in a respective winding layer.

Alternatively, one or more cables can be guided onto the cable drum with both cable ends in each case. If, for example, a cable is wound up with both cable ends, an alternating arrangement of the type "cable end A-cable end B-cable end A-cable end B etc." is wound up in a respective cable winding layer. For the sake of simplicity, the following always refers to a plurality of cables, which is also to be understood in the sense of a plurality of cable ends.

In an advantageous further development of the invention, the plurality of cables are wound up simultaneously at the same cable speed. This avoids the need for complicated cable guides and special measures to achieve the desired gradient. In particular, the two cables can lie directly adjacent to each other and/or be wound or unwound simultaneously at the same cable speed while touching each other.

Advantageously, when viewed in the direction of the winch rotation axis, a certain spread can be provided between the cables running in or off at the same time. In particular, one cable can be wound or unwound leading by a certain angle and the other cable can be wound or unwound lagging accordingly. If three or more cables are wound up or unwound at the same time, such an acute lead angle can be provided between each two adjacent cables. The angle mentioned is advantageously >0°, but <360°, so that the offset during winding is given, but not greater than one turn. For example, very small offset angles in the range of 1°-10°, for example, or quite large offset angles in the range of 350°-359°, for example, can be provided. In principle, however, other angles in the range of 0°<angle<360° can also be provided.

In particular, the cable can be wound up leading, which connects to or comes into contact with a cable turn already wound up in the same winding layers, while the other or another cable of the plurality of simultaneously wound cables is wound up trailing and connects to or comes into contact with the leading cable in the winding layer. In other words, of the plurality of cables that are wound up simultaneously, the cable that runs or is arranged closest to an already wound cable turn of the same cable winding layer is wound up first.

According to another aspect of the present invention, the winding region of the drum of the cable winch, with windings in a plurality of layers, is wound with an at least approximately constant cable pitch, which may be an integer multiple of the cable diameter. Such a large, substantially constant pitch can produce a stable winding pattern of a plurality of layers, which can efficiently prevent a cable strand from cutting into between two cable strands of an underlying winding layer. Due to the relatively large, uniform pitch, a relatively large crossing angle can be achieved between cable winding layers lying on top or above each other, which prevents cutting in. Said crossing angle means the angle between the longitudinal axes of two cable portions or cable turns lying one on top of or over each other, when the winding progression image is viewed in a direction radial to the cable drum shell.

Said cable crossing angle of two cable portions or cable turns lying over each other can be at least 2° or more than 3° or more than 4° or more than 5° or even more than 10° in order to be able to efficiently prevent cutting in even if the cable is wound up with low rope tensioning but unwound with higher rope tensioning. Such a relatively large crossing angle can prevent cutting in even if only one cable is wound onto the drum, if necessary, or reduce the risk of such cutting in.

Advantageously, a respective cable layer with a constant pitch is wound crosswise over the underlying, already wound cable layer. The layer change therefore does not have to take place at a specific point within the meaning of a specific rotation angle of the cable drum, which makes the winding less susceptible to larger cable tolerances, lower transverse elasticities of the cable as well as larger tolerances in the clear width of the cable drum.

Advantageously, due to the crosswise winding in the winding stack, there is no parallel region in which the cable turns of the winding layers lying on top of each other would run parallel to each other. Without such a parallel area, the cutting of the cable into the underlying cable layer is reliably prevented.

If the cable drum is wound with a constant pitch per cable layer, higher winding speeds can be realized more easily, since acceleration processes of the cable and any reeling device present in the axial direction of the drum do not occur or are avoided. Such acceleration processes, on the other hand, occur especially in the aforementioned Lebus winding at the transitions between the parallel regions and the crossing regions and can induce cable oscillations. On the other hand, winding with a constant pitch is expected to result in lower cable excitation and, consequently, lower cable oscillation.

At the same time, during winding with a constant pitch, there is achieved a simplification of the requirements for any reeling device that may be present. Since a constant feed of the reeling device can be run without alternating movements as well as without accelerations when winding the respective cable layer, the control of the reeling device is considerably simplified.

In principle, however, the cable drum can also be wound with a non-constant pitch or also with a constant pitch which does not correspond exactly to the integer multiple of the cable diameter. As long as a sufficient crossing angle is provided, cutting into an underlying winding layer of the cable can be avoided.

Such a reeling device can be used in particular for improving the reeling behavior, said reeling device being provided or designed for guiding at least one cable running in and/or off.

A control unit for controlling said reeling device may be of mechanical design or may also comprise an electronic control module, for example comprising a microprocessor, a program memory and a control program storable therein, in order to be able to control a feed actuator which can adjust the reeling device, in particular its cable guide element, for example parallel to the cable winch rotation axis.

If the control unit is mechanically constructed, the reeling device can be moved mechanically coupled to the cable drum, or an advancing movement can be generated.

In this respect, for each cable or a sub-group of cables, there can be provided a separate reeling device. Alternatively, a reeling device can be used for a plurality of cables, in particular all cables to be wound and unwound at the same time. Such a reeling device for a plurality of cables may have a plurality of cable guiding means for the plurality of cables, which may be interconnected and/or driven together. For example, a deflection block with two deflection pulleys and/or sliding deflection contours can be provided, which can guide two cables and can be adjusted by a common drive device essentially parallel to the rotation axis of the cable drum.

Alternatively, two separate cable guide blocks can be adjustably mounted and adjusted by one common or two separate actuators. For example, two guide blocks may be engaged with two actuator spindles which may be driven by a motor to allow the guide elements to be adjusted by rotating the spindles.

The winding method described also provides greater design freedom for the cable drum and greater resilience to tolerances. The drum shell of the cable winch can, for example, be provided with a groove or can also be configured without a groove. If such a groove is provided on the cable sheath, it can advantageously be configured with a constant pitch, making it relatively inexpensive to produce the groove on the drum shell.

It may be sufficient if only part of the drum shell is provided with a groove. In particular, the cable run-in region of the drum shell can be provided with such a groove in order to provide a direction, so to speak, and to stabilize the initial region of the winding pattern, while a drum portion spaced from or opposite the cable run-in region can be formed without a groove.

In particular, a grooved profile may be provided on the drum shell which, when viewed in cross-section, conforms to the cable cross-sectional contour.

The lateral flanges, which laterally delimit the winding region, can be parallel and/or have flanks extending radially to the drum axis of rotation.

Alternatively, however, non-parallel flanged wheels can be provided whose flanks facing the winding region can, for example, be conical, in particular widening conically towards the radial outer side, or can also be stepped.

BRIEF DESCRIPTION OF THE DRAWINGS

The invention will be explained in more detail in the following with respect to preferred embodiments and to associated drawings. The drawings show.

DETAILED DESCRIPTION

Figure 1:
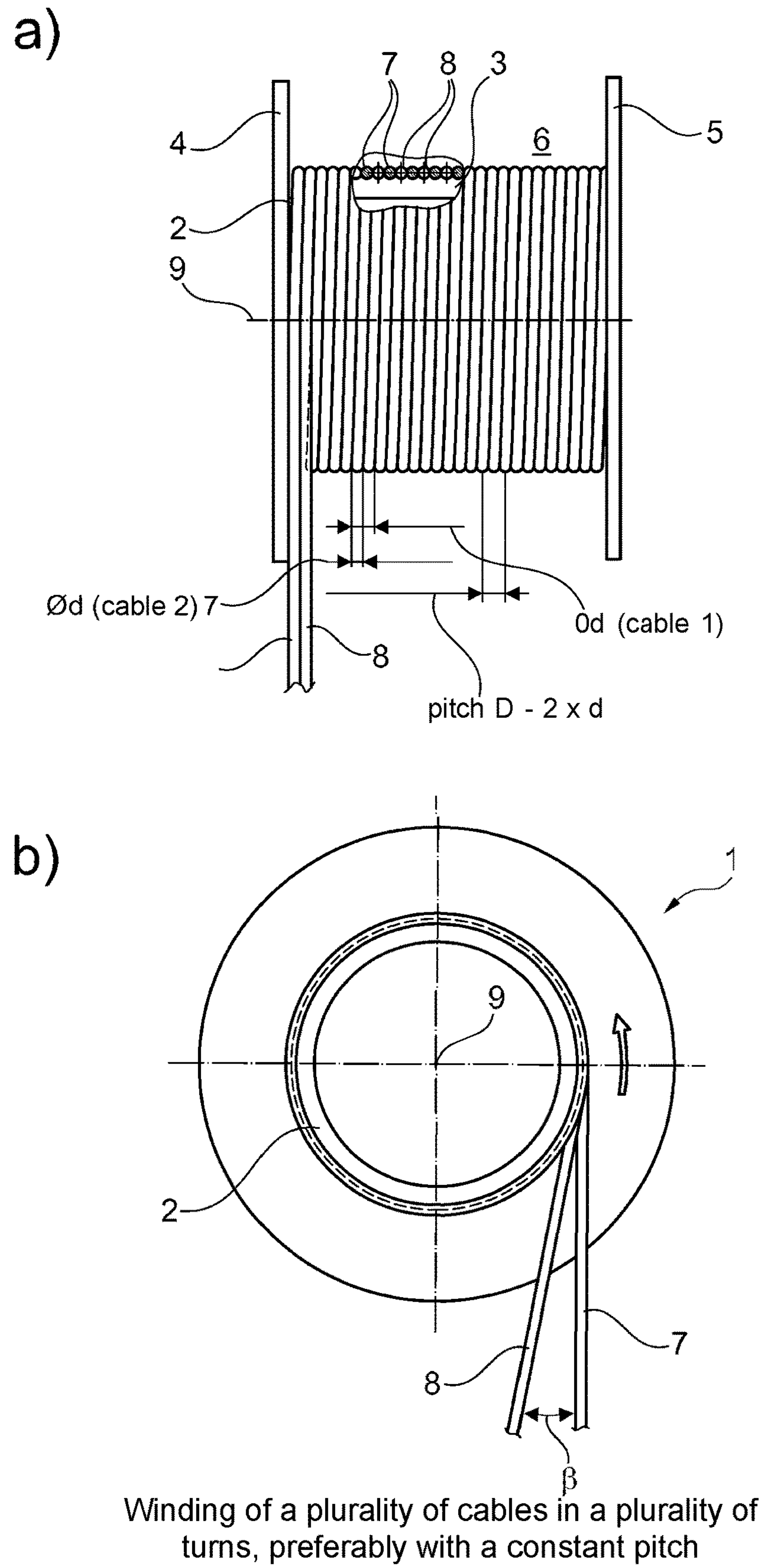
FIG. 1: a cable winch with initially still single-layer winding of the drum, where partial view a shows the image of the progression of the winding of the cable in a partial sectional view and shows the alternating arrangement of two wound cables on the drum shell, while partial view b shows a front view of the cable winch and the spreading of the trailing and leading cables wound onto the drum.
Figure 2:
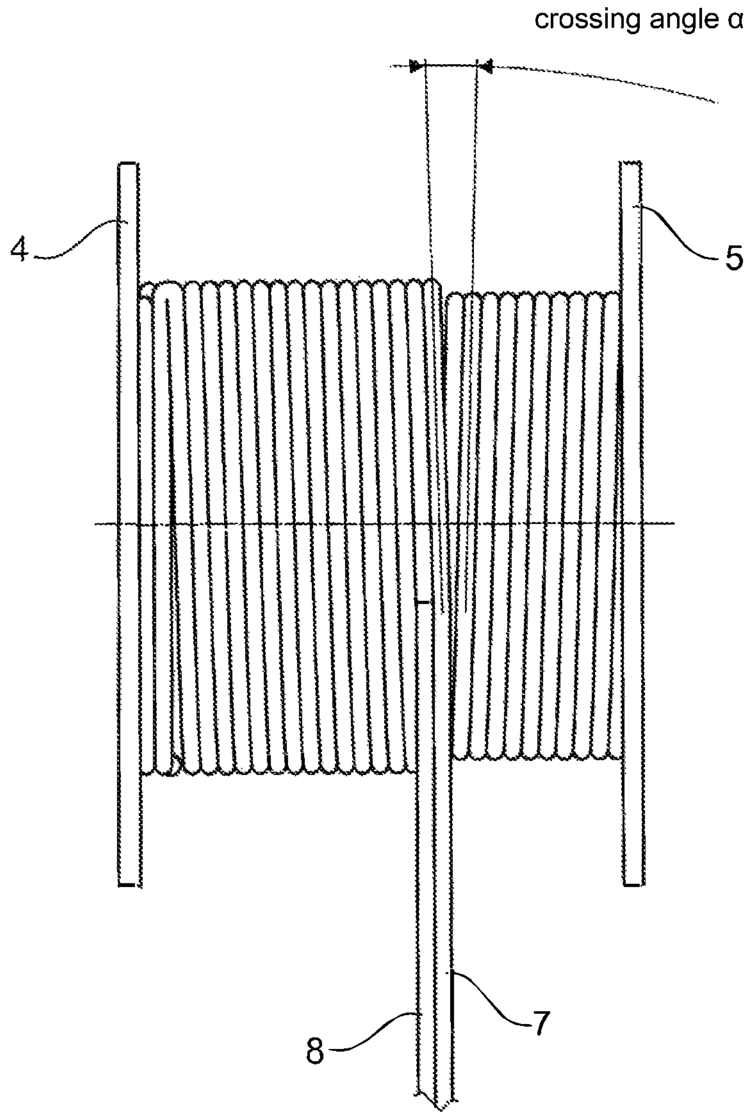
FIG. 2: a top view of the cable winch with windings in a plurality of layers from FIG. 1, showing the angle of intersection between the cable turns of an upper winding layer and the lower winding layer located underneath.

As shown in the figures, the cable winch 1 comprises a cable drum 2 with a substantially cylindrical drum shell 3, on the outer circumferential surface of which a cable groove profile can be provided which fits the cable cross-sectional contour and which can wind around the drum shell 3 with a constant pitch. Alternatively, the outer circumferential surface of the drum shell 3 can also be smooth, cf. for example FIG. 3.

Said drum shell 3, together with two flanged wheels 4 and 5 which may be provided at axial end regions of the cable drum, delimits a winding region 6 in which one or more cables 7, 8 may be wound onto the cable drum 2.

Said flanged wheels 4 and 5 can be configured parallel to each other, in particular have inner flank surfaces which face the winding region 6 and can extend radially to the axis of rotation 9 of the cable winch 1, cf. for example FIG. 1, FIG. 2, FIG. 3 or FIG. 4. Alternatively, however, said flanged wheels 4 and 5 can also be configured non-parallel to each other. In particular, the inner flank sides of the flanged wheels 4, 5 can, for example, widen conically towards the radial outer side, see FIG. 5. Alternatively, stepped and/or arcuately curved cross-section contours of the inner flank sides can also be provided.

As the figures show, the cable drum 2 can be redundantly wound with a plurality of cables, wherein in particular two cables 7 and 8 can be wound or unwound onto the cable drum 2 at the same time. As an alternative to such redundant winding with two separate cables 7 and 8, however, two cable ends 7 and 8 of the same cable can also be wound onto the cable drum 2. The two cables or ends 7 and 8 are wound onto the cable drum 2 in the same winding region 6 between the two flanged wheels 4 and 5, in particular in such a way that the cables 7 and 8 alternate with each other in the image of the progression of the winding of the cable of a winding layer, so that a pattern "cable 1-cable 2-cable 1-cable 2-cable 1 etc." is produced, cf. FIG. 1*a*. When winding with two cable ends, a corresponding pattern "cable end 1-cable end 2-cable end 1-cable end 2-cable end 1 etc." results. When two cables 7 and 8 are referred to in the following, two cable ends 7 and 8 may also be meant.

Figure 3:
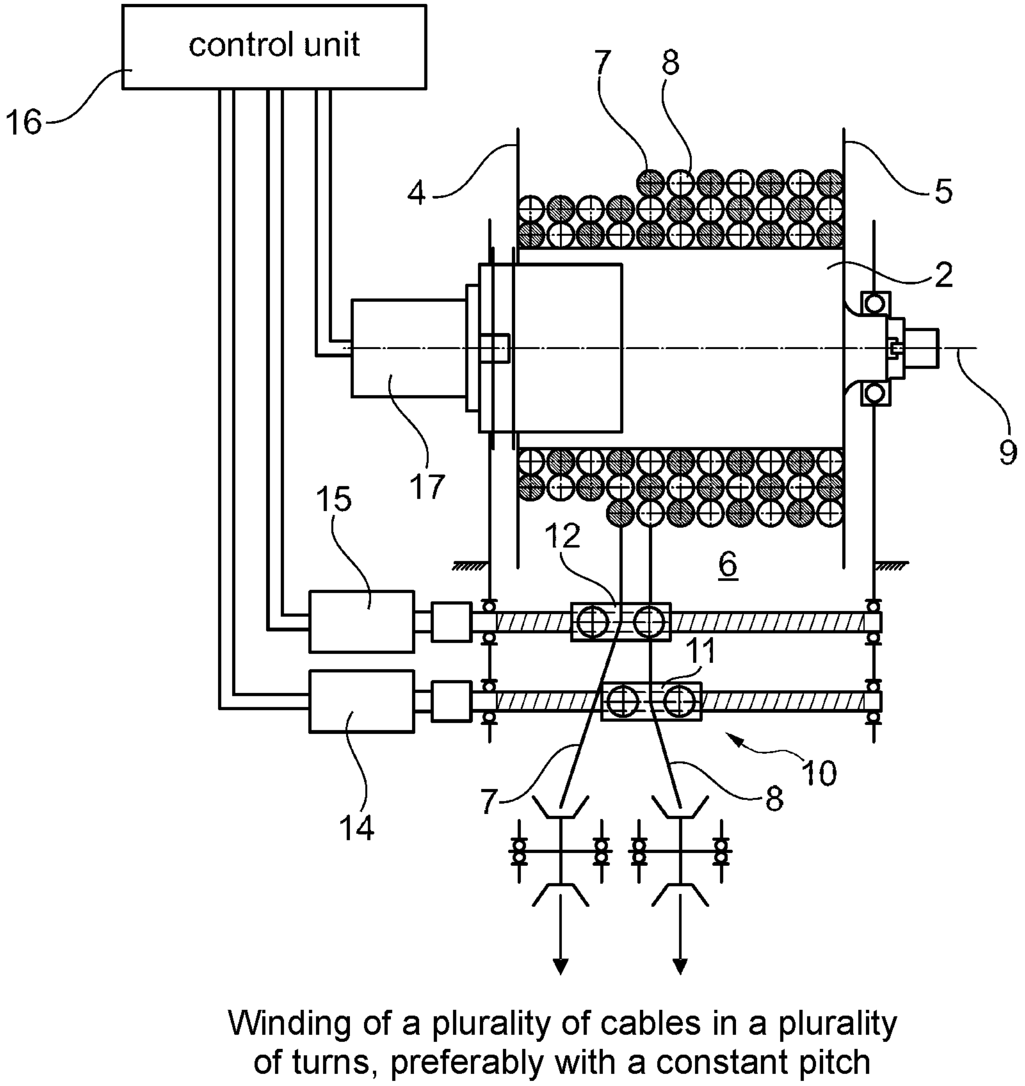
FIG. 3: A top view of a cable winch with windings in a plurality of layers, which has been wound with two cables in a multiple strand configuration, wherein a reeling device with two separate cable guide elements for two separate cables is shown, wherein a control unit can control the motor drives of the two cable guide elements and the winch motor.
Figure 4:
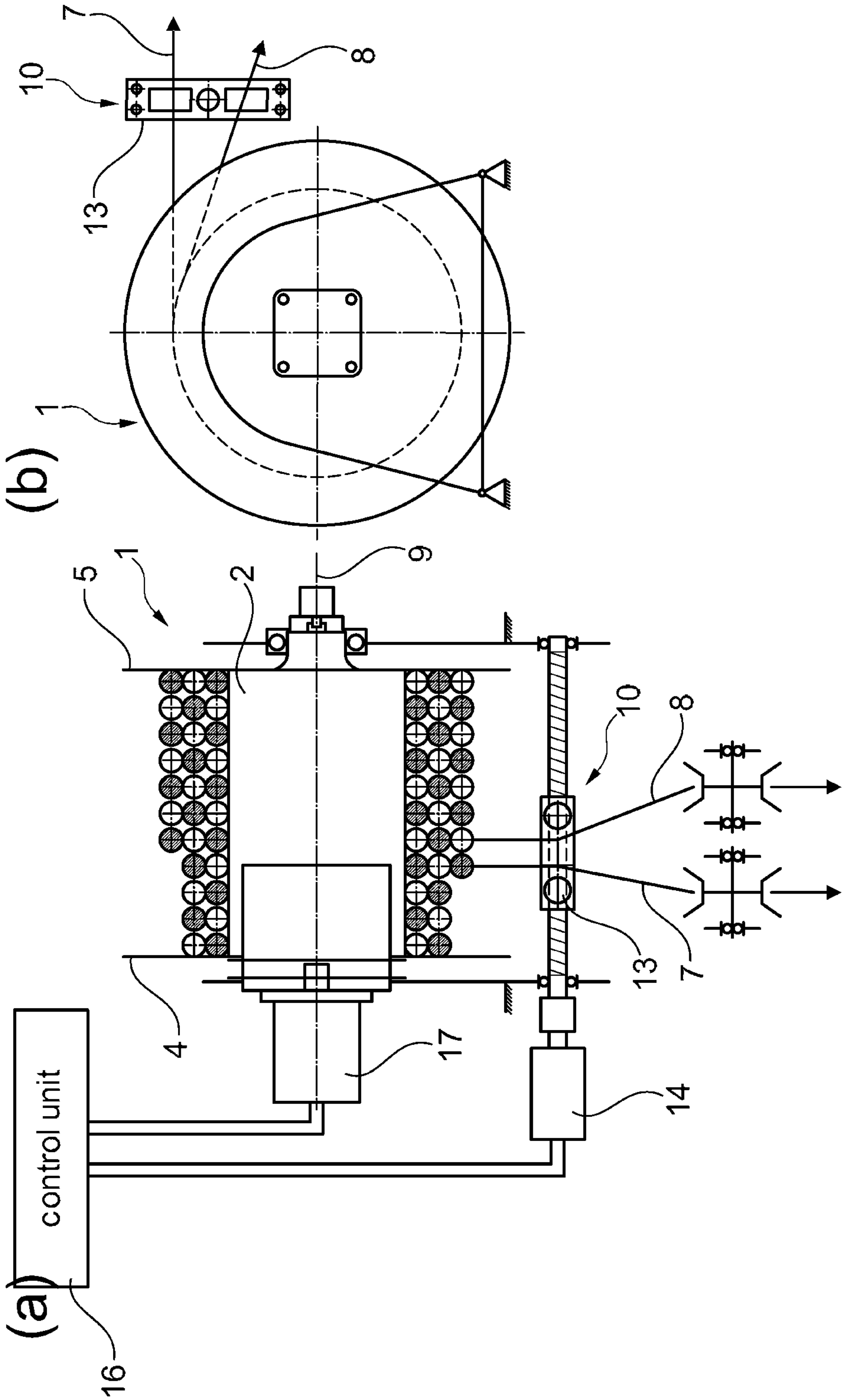
FIG. 4: an illustration of a reeling device with a joint cable guide element for a plurality of cables, wherein partial view a shows a top view of the cable winch and its reeling device, while partial view b shows a front view of the cable winch and the reeling device to illustrate the two-level configuration of the joint cable guide element for the sprayed reeling of two cables.
Figure 5:
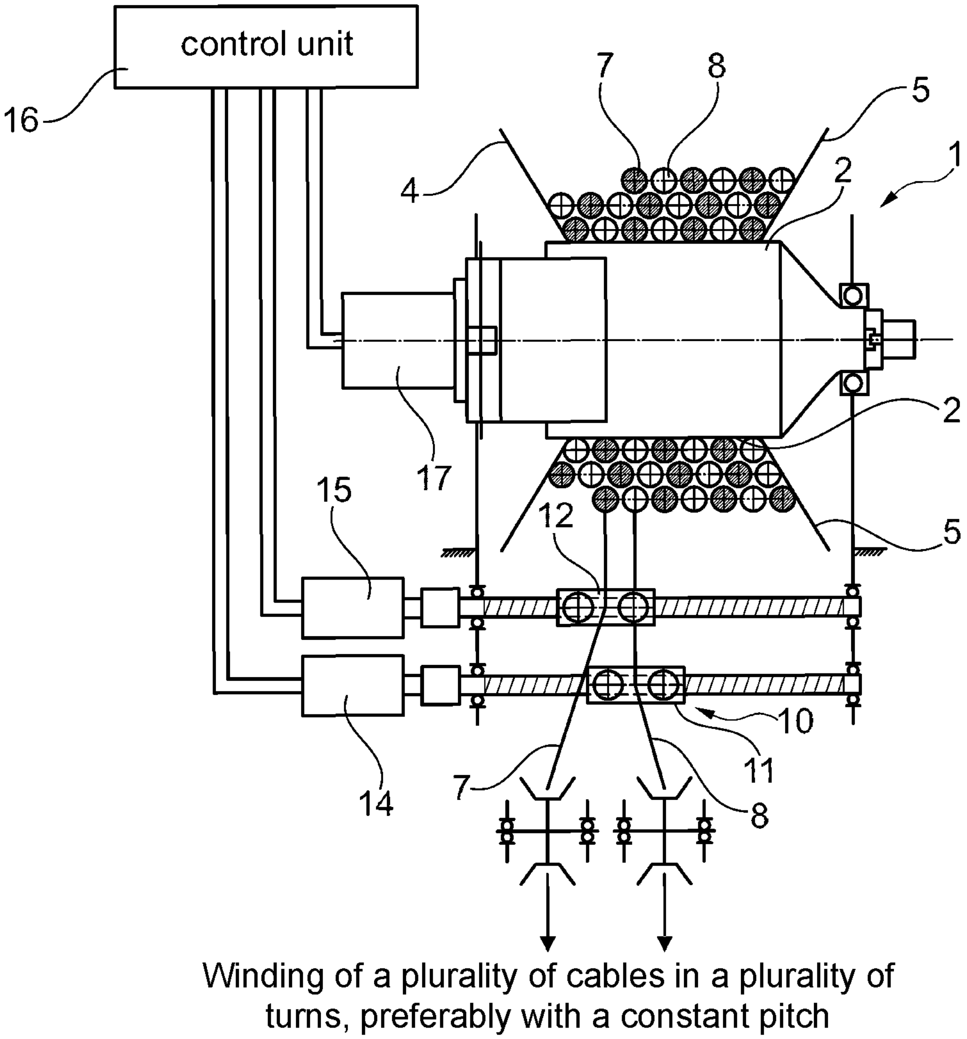
FIG. 5: a top view of a cable winch with a reeling device similar to FIG. 3, wherein the cable winch has non-parallel, conically sprayed flanged wheels.
Figure 6:
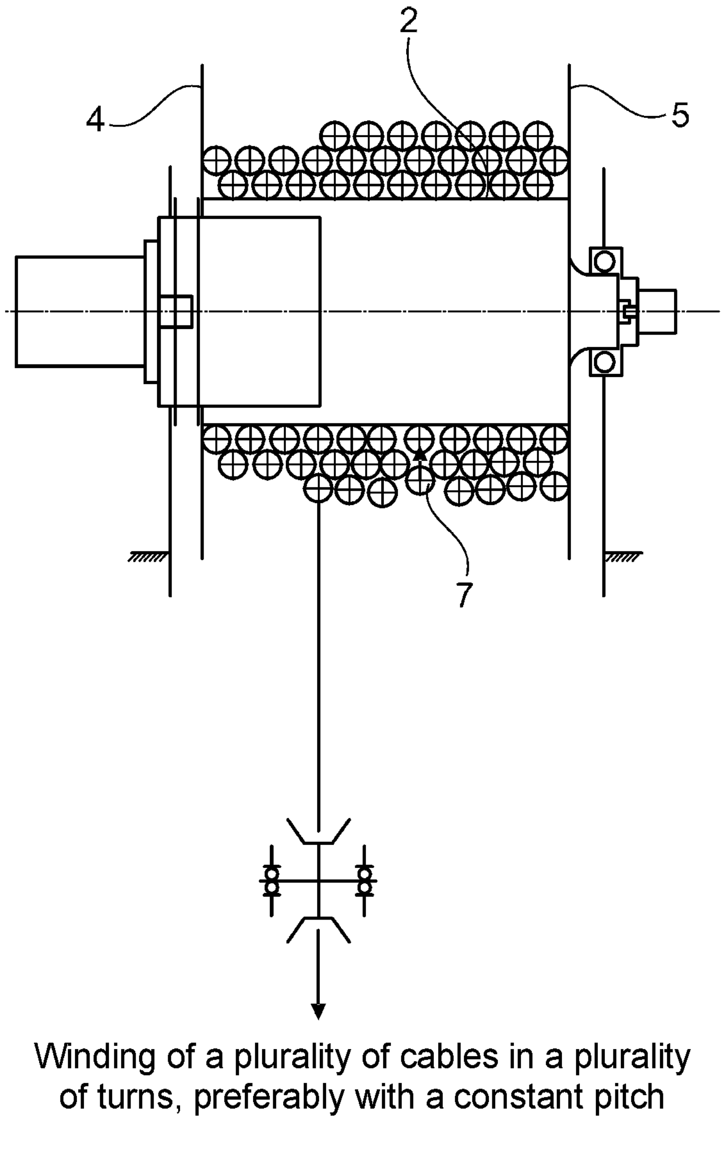
FIG. 6: a top view of a cable winch with windings in a plurality of layers, showing a possible cutting of a cable turn into an underlying winding layer.

Advantageously, the two cables 7 and 8 are wound up in each of the plurality of winding layers according to said alternating pattern, cf. FIG. 3 and FIG. 4.

As FIG. 1*b* shows, the cables 7 and 8 can advantageously be wound onto the cable drum 2 with a spread, so that one cable is wound leading and the other cable is wound trailing a short distance. The spread angle β, which can be seen when the cable winch 1 is viewed in a direction parallel to the axis of rotation 9, can be selected, for example, in the range=$0° < \beta < 360°$, so that, on the one hand, there is a spread when winding/unwinding, but this is smaller than a full winding turn.

Advantageously, cables 7 and 8 are wound onto the cable drum 2 with a constant pitch p, wherein said pitch p can be the same amount in each winding layer or can be equal in amount. However, the pitches in successive winding layers are opposite to each other, so that the cable turns of successive winding layers cross each other at an angle of intersection α, cf. FIG. 2. Said crossing angle α can be relatively large due to the double-strand winding, for example more than 2° or more than 3° or even more than 5° or more than 10°.

In order to stabilize the winding and to minimize transverse tension forces which may affect the winding behavior, the cables 7 and 8 can be guided by means of a reeling device 10 which can guide the position of the cable running in and/or off in the axial direction, i.e. parallel to the axis of rotation 9, relative to the cable drum 2 and/or guide it radially or transversely to said axis of rotation.

As FIG. 3 shows, said reeling device 10 may have separate, dedicated cable guide elements 11 and 12 for each cable 7, 8.

Alternatively, however, the reeling device 10 can also have a common cable guide element 13 for a plurality of cables 7, 8. Such a common cable guide element 13 can, for example, have separate cable guide portions, for example in the form of guide holes, which can be arranged offset in the direction transverse to the axis of rotation 9, cf. FIG. 4*b*, in order to allow the plurality of cables 7 and 8 to run onto or off the cable drum 2 with the desired spread angle β. At the same time, the cable guide element 13 can also guide the cables 7 and 8 axially in order to control or support the winding with the desired pitch.

As FIGS. 3 and 4 show, the at least one cable guide element 11, 12, 13 can be axially adjusted substantially parallel to the axis of rotation 9 of the cable winch 1 relative to the cable drum 2, for example by means of a spindle drive or also a carriage which can be adjusted, for example, by means of a hydraulic cylinder.

Regardless of the specific design of the drive train, the reeling device 10 can have a common drive motor or separate drive motors for the feed adjustment of the cable guide element(s) 13 or 11, 12, wherein, for example, such a motor can be configured to operate electrically or hydraulically. Alternatively, a mechanical positive coupling could be provided to derive the advancing movement from the cable drum rotation.

According to the drawn embodiments, the feed drives 14, 15, for example in the form of electric motors, can be controlled by a control unit 16, which can control the feed of the cable guide elements 11, 12, 13 as a function of a rotation of the cable drum 2 and, if necessary, taking into account the winding position or the resulting cable lever arm.

Said control unit 16 can also simultaneously control a cable winch drive 17 in order to be able to adapt the feed speed of the reeling device 10 to the winding speed.

The cable winch 1 may advantageously be used on a hoisting device, for example a crane such as a tower crane, a mobile crane, an offshore crane or other crane, or even a construction machine such as a cable excavator.

In particular, the cable winch 1 can also be used with passenger conveyors or for mixed load and passenger conveyors, such as elevators.

We claim:

1. A method of winding a cable winch, in which method cable winding layers are wound one over the other, wherein a plurality of cables or cable ends are wound in the cable winding layers comprising multiple strands onto the same winding region of the cable winch such that in each of the cable winding layers, the plurality of cables or cable ends are wound adjacent to each other, wherein the plurality of cables or cable ends are wound side by side in the same sequence in each of the cable winding layers, wherein successive cable winding layers are wound with pitches opposite to each other so that the cable winding turns of successive cable winding layers cross each other at an acute crossing angle, wherein a separate cable guide element is used for each of the plurality of cables to guide each cable in an axial direction and a direction transverse to the axial direction, and wherein the plurality of cables are guided such that the plurality of cables are wound onto a cable drum with a spread in terms of an offset in a circumferential direction defining an acute spread angle when viewing the cable winch in the direction of the cable winch rotation axis.

2. The method of claim 1, wherein the plurality of cables or cable ends are wound up simultaneously at the same cable speed.

3. The method of claim 1, wherein the plurality cables or cable ends, as viewed in the direction of the cable winch rotation axis, are leading and trailing wound by the acute spread angle with respect to each other.

4. The method of claim 1, wherein the plurality of cables or cable ends are wound alternately side by side in the same sequence in each of the cable winding layers.

5. The method of claim 1, wherein each of the cable winding layers is wound with a constant pitch, wherein the constant pitch is approximately an integer multiple of the cable diameter, and wherein the acute crossing angle is constant.

6. The method of claim 1, wherein the cable winding layers are wound with at least partially varying pitches or a pitch that deviates from an integer multiple of the cable diameter.

7. The method of claim 1, wherein the acute crossing angle is more than 10°.

8. A cable winch having a cable drum on which a winding region is enclosed by two flanged wheels which are spaced apart from one another and in which a plurality of cables or cable ends can be wound up, wherein when the plurality of cables or cable ends are in a wound configuration on the cable winch, the plurality of cables or cable ends are wound in cable winding layers comprising multiple strands onto the same winding region of the cable winch such that in each of the cable winding layers, the plurality of cables or cable ends are wound adjacent to each other, wherein when the plurality of cables or cable ends are in the wound configuration on the cable winch, the plurality of cables or cable ends are wound side by side in the same sequence in each of the cable winding layers, wherein when the plurality of cables or cable ends are in the wound configuration on the cable winch, successive cable winding layers are wound with pitches opposite to each other such that the cable winding turns of successive cable winding layers cross each other at an acute crossing angle, wherein a separate cable guide element for each of the plurality of cables is configured to guide each respective cable in an axial direction and a direction transverse to the axial direction, and wherein the plurality of cables are guided such that the plurality of cables are wound onto a cable drum with a spread in terms of an offset in a circumferential direction defining an acute spread angle when viewing the cable winch in the direction of the cable winch rotation axis.

9. The cable winch of claim 8, wherein the plurality of cables or cable ends are wound alternately side by side in the same sequence in each of the cable winding layers.

10. The cable winch of claim 8, wherein the acute crossing angle is constant.

11. The cable winch of claim 10, wherein the acute crossing angle is greater than 10°.

12. The cable winch of claim 8, wherein a reeling device is provided for guiding at least one of the plurality of cables or cable ends during reeling and unwinding, wherein the reeling device comprises the separate cable guide element for each of the plurality of cables, wherein the separate cable guide element for each of the plurality of cables is mounted adjustably in the axial direction at least approximately parallel to the cable winch rotation axis and is actively adjustable by a feed drive or by a respective separate feed drive.

13. The cable winch of claim 12, wherein a joint cable guide element is provided for at least two of the plurality of cables or cable ends, and is axially adjustable by the feed drive.

14. The cable winch of claim 12, wherein the separate cable guide element for each of the plurality of cables is configured and/or disposed such that a first cable can be wound onto the cable drum in a trailing manner and a second cable can be wound onto the cable drum in a leading manner, and the first cable and the second cable or an end of the first cable and an end of the second cable such that the acute spread angle is in the range of 5° to 20° between them in a viewing direction parallel to the cable winch rotation axis.

15. The cable winch of claim 14, wherein the cable drum comprises a drum shell outer surface at least partially with a groove profiling having a pitch.

16. The cable winch of claim 15, wherein a cable inlet portion of the drum shell outer surface is provided with the groove profiling, while a portion of the drum shell outer surface spaced from the cable inlet portion is configured to be without grooves.

17. A hoisting device comprising at least the cable winch of claim 8.

18. The hoisting device of claim 17 configured as a crane comprising a tower revolving crane.

19. The hoisting device of claim 18, wherein the tower revolving crane comprises a height-adjustable mounted crane operator's cabin, wherein the height-adjustable mounted crane operator's cabin is height-adjustable at least by the cable winch and the plurality of cables or cable ends wound thereon.

20. A conveying device for conveying persons with at least one cable winch configured according to claim 8.

21. The conveying device of claim 20 configured as a passenger elevator.

* * * * *